United States Patent
Leonard et al.

(10) Patent No.: US 10,012,728 B2
(45) Date of Patent: Jul. 3, 2018

(54) METHODS AND APPARATUS FOR PROVIDING A DYNAMIC TARGET IMPACT POINT SWEETENER

(71) Applicant: THE BOEING COMPANY, Chicago, IL (US)

(72) Inventors: James V. Leonard, St. Charles, MO (US); Shirley N. Cheng, Richmond Heights, MO (US); Michael G. Neff, Lake Saint Louis, MO (US)

(73) Assignee: The Boeing Company, Chicago, IL (US)

( * ) Notice: Subject to any disclaimer, the term of this patent is extended or adjusted under 35 U.S.C. 154(b) by 456 days.

(21) Appl. No.: 14/923,337

(22) Filed: Oct. 26, 2015

(65) Prior Publication Data
US 2016/0202354 A1 Jul. 14, 2016

Related U.S. Application Data

(63) Continuation of application No. 12/968,815, filed on Dec. 15, 2010, now Pat. No. 9,194,948.

(51) Int. Cl.
| | |
|---|---|
| *G01S 13/89* | (2006.01) |
| *G01S 7/41* | (2006.01) |
| *G01S 13/72* | (2006.01) |
| *G01S 13/87* | (2006.01) |

(52) U.S. Cl.
CPC ........... *G01S 13/89* (2013.01); *G01S 7/41* (2013.01); *G01S 13/723* (2013.01); *G01S 13/87* (2013.01)

(58) Field of Classification Search
CPC .......... G01S 13/89; G01S 7/41; G01S 13/723; G01S 13/87

USPC .......................................................... 342/59
See application file for complete search history.

(56) References Cited

U.S. PATENT DOCUMENTS

| | | | | |
|---|---|---|---|---|
| 5,300,933 | A * | 4/1994 | Discenza | G01S 7/411 |
| | | | | 342/179 |
| 7,642,953 | B2 | 1/2010 | Cheng et al. | |
| 8,180,107 | B2 * | 5/2012 | Broaddus | G01S 3/7864 |
| | | | | 348/139 |
| 2005/0077424 | A1 * | 4/2005 | Schneider | F41G 7/303 |
| | | | | 244/3.11 |
| 2006/0238403 | A1 * | 10/2006 | Golan | F41G 5/08 |
| | | | | 342/62 |
| 2007/0040061 | A1 * | 2/2007 | Williams | F41G 7/2206 |
| | | | | 244/3.1 |
| 2008/0308670 | A1 | 12/2008 | Meyer et al. | |

(Continued)

OTHER PUBLICATIONS

United States Patent and Trademark Office, "Non-Final Office Action," issued in connection with U.S. Appl. No. 12/968,815, dated May 19, 2015, 17 pages.

(Continued)

*Primary Examiner* — Frank J McGue
(74) *Attorney, Agent, or Firm* — Hanley, Flight & Zimmerman, LLC

(57) ABSTRACT

Methods and apparatus for providing a dynamic target impact point sweetener is disclosed. An example method includes identifying a target based on a composite three-dimensional image generated based on data received from a first aerial vehicle acting as a master vehicle and a second aerial vehicle acting as a slave vehicle; changing a role of the first aerial vehicle to the slave vehicle; changing the role of the second aerial vehicle to the master vehicle; and causing, using the second aerial vehicle acting as the master vehicle, a third vehicle to attack the target based on the identity of the target.

28 Claims, 5 Drawing Sheets

(56) References Cited

U.S. PATENT DOCUMENTS

| | | | | |
|---|---|---|---|---|
| 2009/0115654 A1* | 5/2009 | Lo | ............................ | F41G 7/008 |
| | | | | 342/62 |
| 2009/0282384 A1* | 11/2009 | Keppler | ..................... | G06F 8/10 |
| | | | | 717/104 |
| 2011/0264307 A1* | 10/2011 | Guyette | ............... | A01B 79/005 |
| | | | | 701/3 |

OTHER PUBLICATIONS

United States Patent and Trademark Office, "Final Office Action," issued in connection with U.S. Appl. No. 12/968,815, dated Sep. 16, 2014, 15 pages.

United States Patent and Trademark Office, "Non-Final Office Action," issued in connection with U.S. Appl. No. 12/968,815, dated May 7, 2014, 15 pages.

United States Patent and Trademark Office, "Final Office Action," issued in connection with U.S. Appl. No. 12/968,815, dated Sep. 5, 2013, 13 pages.

United States Patent and Trademark Office, "Non-Final Office Action," issued in connection with U.S. Appl. No. 12/968,815, dated Jan. 14, 2013, 19 pages.

United States Patent and Trademark Office, "Notice of Allowance," issued in connection with U.S. Appl. No. 12/968,815, dated Jul. 16, 2015, 20 pages.

U.S. Appl. No. 12/968,815, filed Dec. 15, 2010, 26 pages.

United States Patent and Trademark Office, "Advisory Action," issued in connection with U.S. Appl. No. 12/968,815, dated Jan. 7, 2015, 9 pages.

United States Patent and Trademark Office, "Advisory Action," issued in connection with U.S. Appl. No. 12/968,815, dated Nov. 27, 2013, 2 pages.

* cited by examiner

METHODS AND APPARATUS FOR PROVIDING A DYNAMIC TARGET IMPACT POINT SWEETENER

RELATED APPLICATION

This patent arises from a continuation of U.S. patent application Ser. No. 12/968,815, entitled "METHOD AND APPARATUS FOR PROVIDING A DYNAMIC TARGET IMPACT POINT SWEETENER," filed Dec. 15, 2010. Priority to U.S. patent application Ser. No. 12/968,815 is hereby claimed. U.S. patent application Ser. No. 12/968,815 is hereby incorporated herein by reference in its entirety.

TECHNOLOGICAL FIELD

Embodiments of the present disclosure relate generally to image data processing for tomographic image reconstruction and, more particularly, to the use of tomographic image reconstruction for improving a missile aimpoint such that the missile impacts the most vulnerable point on the target.

BACKGROUND

Missiles of one form or another had been used in combat for centuries prior to the development of guided missile technology in the World War II era. Since then numerous technologies were developed in order to guide missiles to their targets. The use of some form of radiation (e.g., laser or radio waves) has been a common element in many of these guided missiles. However, as advancements in missile guidance have improved, target sophistication continues to improve as well. The cost and complexity of each missile, although being typically only a fraction of the cost and complexity of most targets, makes it ever more imperative that each missile that is fired should be as effective as possible. Accordingly, it becomes increasingly desirable to continue to develop enhancements in missile guidance systems to further the likelihood of success when such weapons are employed.

Missiles with increasingly more sophisticated guidance systems have been developed over the years. In fact, more recently missiles have been developed that can communicate with a central node, such as the platform that launched the missiles, to receive guidance updates in-flight. However, as target sophistication increases, it can be expected that access to the links between launched missiles and a remote central node may be denied in the future. Thus, it may be desirable to develop missile technologies that improve the ability of missiles to not only hit targets, but hit them in the best possible location for strategic impact.

BRIEF SUMMARY

Some embodiments of the present disclosure relate to the provision of an improved guidance system for use with guided missiles. Some example embodiments may be able to provide dynamic determinations to be made regarding preferred points at which to attack a particular target. Moreover, these determinations may be made on a vehicle (e.g., a missile) that is prosecuting an attack on the target. Accordingly, there may be no requirement for the vehicle to be able to communicate with a common platform (e.g., the platform that launched the vehicle) in order to enable such dynamic determinations.

In one example embodiment, an apparatus for providing a dynamic target impact point sweetener is provided. The apparatus may include memory and a processor. The memory may store at least a target library indicating respective target parameters for a plurality of known potential targets. The processor may be configured by stored instructions to generate a composite multi-dimensional representation of a target based on radar data received at the apparatus from other aerial vehicles collecting projections over an area in which the target is located and based on radar data collected by an aerial vehicle in which the apparatus is located, identify the target based on the composite multi-dimensional representation, and generate aimpoint data regarding the target based on an identity of the target. That aimpoint will define the most vulnerable point on the target.

In another example embodiment, a system for providing a dynamic target impact point sweetener is provided. The system may include a plurality of aerial vehicles that are each configured to generate radar data based on projections over an area in which a target is located. One of the plurality of aerial vehicles may be configured to act as a master vehicle and remaining ones of the plurality of aerial vehicles may be configured to act as slave vehicles. The slave vehicles may be configured to provide radar data generated by respective ones of the slave vehicles to the master vehicle. The master vehicle may be configured to generate a composite multi-dimensional representation of the target based on radar data received from the slave vehicles and radar data collected by the master vehicle, identify the target based on the composite multi-dimensional representation, and generate aimpoint data regarding the target based on an identity of the target. That aimpoint will define the most vulnerable point on the target.

In another example embodiment, a method for providing a dynamic target impact point sweetener is provided. The method may include receiving, at a master aerial vehicle, radar data corresponding to a target from at least one slave aerial vehicle in communication with the master vehicle, generating a composite multi-dimensional representation of the target based on radar data received from the at least one slave aerial vehicle and radar data generated by the master aerial vehicle, identifying the target based on the composite multi-dimensional representation, and generating aimpoint data regarding the target based on an identity of the target. That aimpoint will define the most vulnerable point on the target.

The features, functions and advantages that have been discussed can be achieved independently in various embodiments of the present disclosure or may be combined in yet other embodiments, further details of which can be seen with reference to the following description and drawings.

BRIEF DESCRIPTION OF THE SEVERAL VIEWS OF THE DRAWING(S)

Having thus described the disclosure in general terms, reference will now be made to the accompanying drawings, which are not necessarily drawn to scale, and wherein:

DETAILED DESCRIPTION

Figure 1:
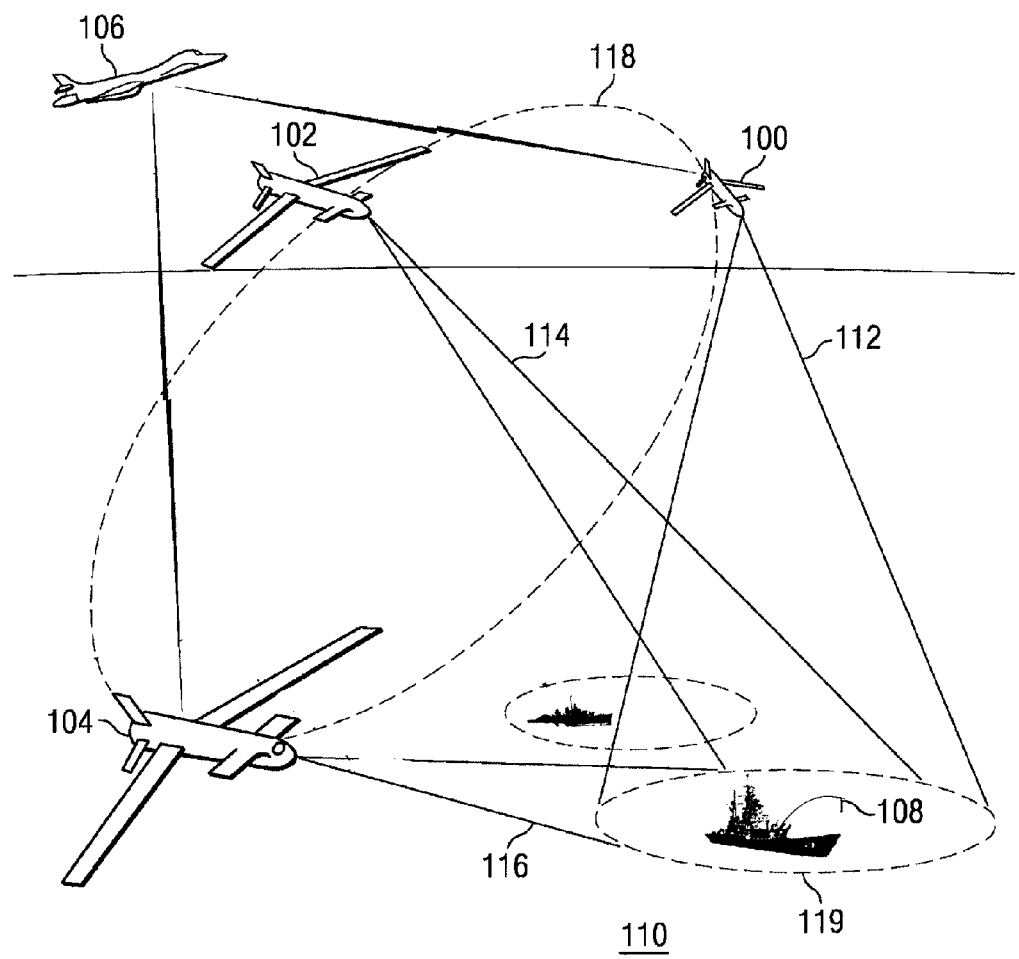
FIG. 1 illustrates a system for providing a dynamic target impact point sweetener according to an example embodiment.

The present disclosure now will be described more fully hereinafter with reference to the accompanying drawings, in which some, but not all embodiments are shown. Indeed, this disclosure may be embodied in many different forms and should not be construed as limited to the embodiments set forth herein; rather, these embodiments are provided so that this disclosure will satisfy applicable legal requirements. Like numbers refer to like elements throughout.

As discussed above, continued efforts are being made to define enhancements to guided missile technology. As an example, U.S. Pat. No. 7,642,953 to Cheng et al., which shares a common assignee with the present application, describes the use of three dimensional (3D) tomographic image reconstruction to develop an accurate image of a target. According to U.S. Pat. No. 7,642,953, the contents of which are incorporated herein by reference, a central node is in communication with a plurality of vehicles to collect radar data about an object. The central node, which may be for example, the platform that launched the vehicles, uses radar return data corresponding to the object from each of the vehicles (e.g., missiles) to generate the 3D image of the object.

Example embodiments contemplate that it may not always be possible, or perhaps even desirable to communicate with the central node. For example, the communication environment may be hostile enough to make sharing the radar return data with the central node difficult or even impossible. Example embodiments may therefore enable the sharing of radar return data among the vehicles themselves, without reliance on the central node. Moreover, some example embodiments may enable each of the vehicles to have the ability to generate the 3D image using data collected locally and combined with data provided from other vehicles. Thus, one or more of the vehicles themselves may generate a composite 3D image of the object (e.g., target) so that an accurate assessment of the target may be confirmed. The one or more vehicles may then share the composite 3D image of the object with other vehicles so that, for example, prosecution of an attack on the object may occur with improved confidence in the target's identity.

Some example embodiments may further enable each of the vehicles to have the ability to act as a master vehicle that actually does the composite 3D image generation using data provided from the other vehicles. Although one vehicle may act as the master vehicle, any of the slaves may take over the role of master, if desired or needed.

In some example embodiments, the composite 3D image may be compared to a target image library to determine a vulnerable region (or sweet spot) on the object. For example, the target image library may store data on various classes of targets (or specific hull numbers in some instances) that indicates the location of the engine room, the control center, ammunition storage or other vulnerable areas on the object. The master vehicle may, as an alternative or addition to providing the composite 3D image to other vehicles, provide information indicative of the location of the vulnerable region of the object to the slaves so that the vehicles can each more specifically target the vulnerable region. As such, example embodiments of the present invention may enable the vehicles themselves to dynamically employ a target impact point sweetener to more effectively attack a target, even in the absence of communication with the launching platform or some other remote controlling node.

FIG. 1 illustrates a system for creating a three-dimensional (3D) image of an object according to an example embodiment. The system of FIG. 1 illustrates a plurality of vehicles (e.g., vehicles 100, 102 and 104) that may be associated with a launch platform 106 or other central node. The launch platform 106 or central node may be a manned aircraft or even a ship or other ground-based platform. In the example of FIG. 1, the vehicles 100, 102 and 104 are capable of obtaining radar data of an object (e.g., target object 108) on the surface of the earth 110. The surface of the earth could be either ground or water. It should also be appreciated that although three vehicles and one launch platform are shown in FIG. 1, any number of vehicles and launch platforms could be employed in some embodiments (e.g., including fewer or more vehicles and perhaps more launch platforms).

In an example embodiment, the vehicles 100, 102 and 104 may be any combination of different types of missiles, unmanned aerial vehicles (UAVs) or aircraft that may be capable of obtaining radar data pertaining to the target object 108. As such, for example, the vehicles 100, 102 and 104 may each include hardware (e.g., antennas and corresponding processing equipment) for projecting beams or cones of electromagnetic radiation from corresponding radar systems on each of the vehicles 100, 102 and 104 onto the target object 108 and then collecting the data that returns from those beams or cones. In this example, vehicle 100 projects cone 112, vehicle 102 projects cone 114, and vehicle 104 projects cone 116.

In response to these cones being projected, the different vehicles may each collect the signals that return from a corresponding one of the cones 112, 114 and 116 to generate respective different partial views of the target object 108. Conventional computer assisted tomography that is used for medical purposes to image a part of the body, typically employs a plurality of fixed sensors to receive return data from respective different angles that correspond to the positioning of the sensors at a given time. Similarly, example embodiments may provide a system that can generate a plurality of different views of the target object 108 based on the return data received. However, due to movement of the vehicles 100, 102 and 104, the projected cones 112, 114 and 116 are in relatively constant motion to generate respective different views of the target object 108. Thus, the effects of a medical tomographic image may be reproduced with far fewer sensors since the moving sensors provide for different views over time. Each of the vehicles 100, 102 and 104 may collect its own data that is reflective of the views it has generated over time while receiving radar data corresponding to the target object 108. The radar data may be generated responsive to active transmissions by one or more of the vehicles 100, 102 and 104 (or even the launch platform 106). Each of these respective partial images that are generated by the vehicles 100, 102 and 104 may then be fed to a single master vehicle (e.g., vehicle 100). The master vehicle, which is one of the vehicles instead of being the launch platform 106, may more easily communicate with the other vehicles since it is typically closer in proximity to the other vehicles. In an example embodiment, the vehicles 100, 102 and 104 may communicate with each other using communication links 118. The master vehicle may then generate a composite 3D image of the object based on the radar data received from each of the other vehicles (which may be considered to be slave vehicles).

In an example embodiment, the vehicles 100, 102 and 104 may coordinate (e.g., under control of the master vehicle) to obtain the collection of certain views to provide improved image construction. For example, if a particular aspect or angle of the target object 108 is not accurately represented based on the image data received (e.g., as determined by the master vehicle responsive to generation of the 3D composite image), the master vehicle may identify the missing aspect or angle to one or more of the slaves and the slaves (and/or the master) may maneuver accordingly to attempt to obtain a view of the target object 108 that corresponds to the missing aspect or angle.

Example embodiments of the present invention enable the use of radar images to examine (e.g., with the corresponding cones 112, 114 and 116) an area of uncertainty (AOU) 119 around the target object 108 in order to enable generation of a relatively complete image of the AOU 119 and the target object 108 therein. The vehicles 100, 102 and 104 may fly around the target object 108, which may itself also be moving. Thus, the AOU 119 may be moving. Moreover, in some cases, as indicated above, coordination of the flight paths of the vehicles 100, 102 and 104 may be accomplished via the communication links 118 to provide for control over the formation and/or movement of the vehicles 100, 102 and 104 to improve the quality and/or completeness of the images received therefrom. As such, a relatively accurate composite 3D image of the target object 108 may be generated over time to enable identification of the target object 108.

The master vehicle (e.g., vehicle 100) may receive radar data from each of the other vehicles and combine the received radar data with the radar data collected locally at the master vehicle in order to generate a composite 3D image of the target object 108. In some embodiments, the composite 3D image may be a three dimensional image of the corresponding object on the ground or on the water. The composite 3D image may, in some cases, also include data indicative of some internal features of the target object 108 in instances where sufficient power is able to be used to project the cones in a fashion that permits the transmitted waves to penetrate (at least to some degree) the target object 108. The composite 3D image (with or without data indicative of internal features) may then be compared to a target library to determine an accurate model and/or identity of the target object 108 as described in greater detail below. Once the target object 108 has been identified (or its identity confirmed), aimpoint data may be generated and shared with the other vehicles based on the class or identity of the target object 108. The aimpoint data may then be used by the vehicles to guide prosecution of an attack on the target object 108 based on vulnerabilities of the target object 108 as determined by the identity or classification of the target object 108. This aimpoint data will define the most vulnerable point on the target.

Accordingly, example embodiments may provide for observation of a target to be performed by a plurality of vehicles in which at least one of the vehicles is capable of guiding the observation and also performing tomographic reconstruction of a composite 3D image of the target using data received from the vehicles. The corresponding one of the vehicles may also be configured to identify the target based on the composite 3D image and share information determined based on the identity (e.g., the composite 3D image itself and/or aimpoint data for the identified target) with the other vehicles.

Figure 2:
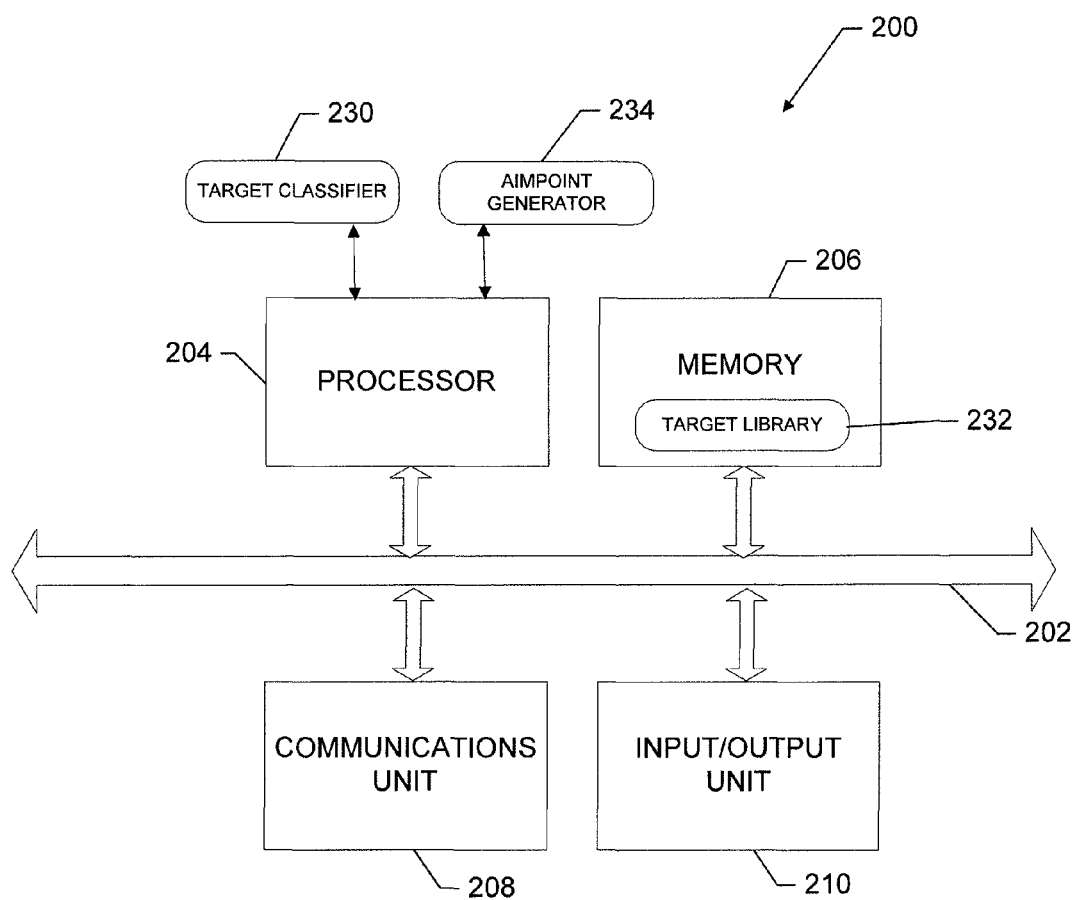
FIG. 2 illustrates a block diagram of hardware that may be employed on a master vehicle or any vehicle that can function as the master vehicle according to an example embodiment.

FIG. 2 illustrates a block diagram of hardware that may be employed on the master vehicle or any vehicle that can function as the master vehicle. It should be appreciated that, as indicated above, in some embodiments all vehicles have the capability of functioning as the master vehicle. Thus, each vehicle may, in some embodiments, include the structure described in FIG. 2.

As shown in FIG. 2, the vehicles 100, 102 and 104 may include a data processing system 200 to process data received responsive to locally received radar returns or return data received by other vehicles and generate the composite 3D image of an object. The data processing system 200 may include a communication bus 202 or other communication fabric to provide communication between the various components of the data processing system 200. The data processing system 200 components may include a processor 204, a memory 206, a communication unit 208 and an input/output unit 210.

The processor 204 may be embodied in a number of different ways. For example, the processor 204 may be embodied as various processing means such as a processing element, a coprocessor, a controller or various other hardware processing devices including integrated circuits such as, for example, an ASIC (application specific integrated circuit), an FPGA (field programmable gate array), a hardware accelerator, or the like. In an exemplary embodiment, the processor 204 may be configured to execute instructions stored in a memory device (e.g., memory 206) or otherwise accessible to the processor 204. By executing stored instructions or operating in accordance with hard coded instructions, the processor 204 may control the operation of the data processing system 200 by directing functionality of the data processing system 200 associated with implementing composite 3D image generation and target identification described herein according to the respective configuration provided to the data processing system 200 by the processor 204 and/or the instructions stored in memory 206 for configuring the processor 204. As such, whether configured by hardware or software methods, or by a combination thereof, the processor 204 may represent an entity capable of performing operations according to embodiments of the present invention while configured accordingly.

The memory 206 may include, for example, volatile and/or non-volatile memory. The memory 206 may be configured to store information, instructions and/or the like. For example, the memory 206 could be configured to buffer data for processing by the processor 204 or prior to transmission or responsive to reception. Additionally or alternatively, the memory 206 could be configured to store instructions for execution by the processor 204. The memory 206 may be an integrated part of the data processing system 200 or may be a removable memory device.

In some embodiments, the communication unit 208 may include hardware, and in some cases also software for configuring the hardware, for enabling the data processing system 200 to interface with other devices and users, if applicable. Thus, for example, if the data processing system 200 is embodied as the master vehicle, the data processing system 200 may include circuitry and/or components to enable inter-device interface (e.g., via the communication links 118). As such, the communication unit 208 may include wired and/or wireless interface circuitry such as an antenna (or antennas) and corresponding transmit and receive circuitry to enable wireless communication with other devices over a radio access technology.

In an example embodiment, the input/output unit 210 may provide for connection to any other modules that may be used in connection with the data processing system 200. Thus, for example, the input/output unit 210 may provide for an interface with a radar system for generating transmissions and receiving and/or processing return data. The input/output unit 210 may also provide for any other interface needed with other components to provide, receive, process, store, or otherwise manipulate data that may be generated or used within the data processing system 200.

In an example embodiment, the processor 204 and/or the memory 206 may comprise portions of processing circuitry configured to cause the data processing system 200 to perform functionality according to the configuration either hardwired into the processor 204 or provided by the execution of instructions stored in the memory 206. As such, the data processing system 200 may be configured to control processes associated with composite 3D image reconstruction and target identification along with the provision of aimpoint data to other vehicles as described herein. Thus, for example, the data processing system 200 may represent an apparatus that may be configured (e.g., by execution of stored instructions) to generate a composite three dimensional representation of a target based on radar data received at the apparatus from other aerial vehicles generating projections over an area in which the target is located (e.g., the AOU 119) and based on radar data generated by an aerial vehicle in which the apparatus is located. The apparatus may be further configured to identify the target based on the composite three dimensional representation, and generate aimpoint data regarding the target based on an identity of the target. This aimpoint data will define the most vulnerable point on the target. In an example embodiment, the apparatus may include memory storing at least an updateable target library indicating respective target parameters for a plurality of known potential targets. The processor 204 may be further configured to communicate the aimpoint data from the apparatus, acting as a master vehicle, to at least one of the other aerial vehicles acting as a slave vehicle. In some embodiments, identifying the target may include comparing the composite three dimensional representation of the target to a plurality of known representations of targets in the target library to determine the identity of the target based on a degree of matching between the composite three dimensional representation and one of the known representations. In some cases, generating aimpoint data may include utilizing characteristics regarding vulnerable locations within the target based on the identity of the target to generate coordinates for an aimpoint for attacking the target. In an example embodiment, the processor 204 may be further configured to shift the apparatus from a master vehicle status to a slave vehicle status thereby causing the apparatus to stop generating the composite three dimensional representation, identifying the target and generating the aimpoint data and instead causing the apparatus to provide radar data generated by the aerial vehicle to one of the other aerial vehicles acting as a master vehicle and receive aimpoint data from the master vehicle. In some embodiments, the processor 204 may be further configured to define a transit time by which the processor 204 is to identify the target and during which the aerial vehicles collect radar data regarding the target as described below.

Figure 3:
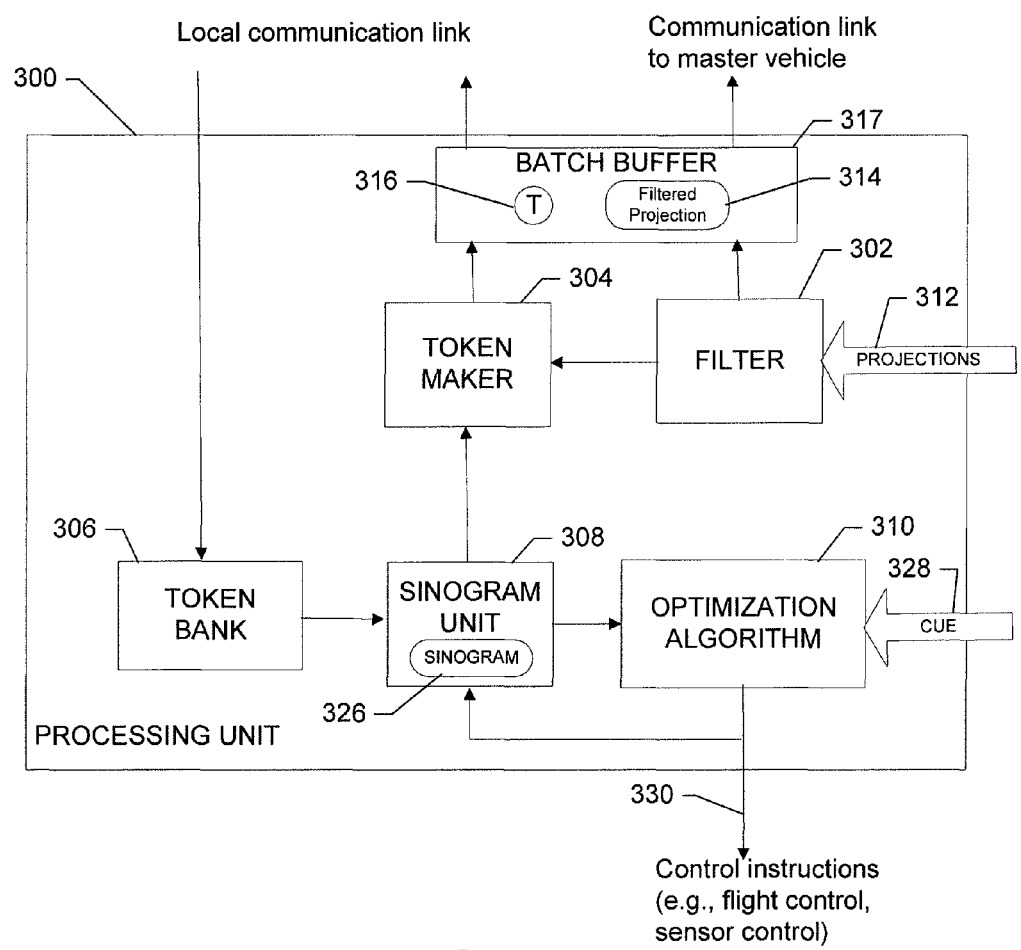
FIG. 3 illustrates various components of a processing unit that may be configured according to an example embodiment.

In some embodiments, the processor 204 may be configured to control (e.g., via execution of corresponding instructions) various functional components used to define a processing unit 300 (see FIG. 3) that may carry out example embodiments. However, in some cases, the processing unit 300 may actually be embodied by the processor 204 (e.g., by execution of instructions for performing the corresponding functions of the processing unit 300). FIG. 3 illustrates various components of the processing unit 300 according to an example embodiment. The processing unit 300 may include a filter 302, a token maker 304, a token bank 306, a sinogram unit 308 and an optimization algorithm unit 310. The filter 302 may be a local filter that filters radar data collected by the processing unit 300 before the radar data is processed by the processor 204 for composite 3D image reconstruction, target identification and/or aimpoint data provision. As used herein a portion of the radar data collected for an object by the processing unit 300 may be referred to as a projection. In an example embodiment, the filter 302 may receive projections 312 and store filtered projections 314 along with a token 316 in a batch buffer 317 for communication to the master vehicle (or for use locally for composite 3D image reconstruction and target identification along with the provision of aimpoint data when the vehicle employing the processing unit 300 is the master vehicle). The data stored in the batch buffer 317 may be communicated via the communication links 118 to the master vehicle or used locally if the processing unit 300 is associated with a vehicle acting as the master vehicle.

The batch buffer 317 may be configured to store multiple tokens and associated filter projections for transmission in batches. In some cases, the batch buffer 317 may provide for matching the data rates between the communication links employed and generation of filtered projections 314 by filter 302. The token maker 304 may generate tokens (e.g., token 316) that are grouped for batch communication to the master vehicle. Generally speaking, a token may be generated by the token maker 304 after the radar system completes one cycle of data collection that is processed by the filter 302. A cycle may refer to the minimum amount of time needed to collect and process one portion of radar data or one projection including conditioning and filtering, as appropriate. Each token may include an identification of the corresponding vehicle on which the processing unit 300 is located, a location of the vehicle (e.g., at the time the corresponding radar data is generated), a time stamp of when the radar data was generated, etc. Other information that may be included in the token may include sensor operating parameters or any other information that may be used to identify what portions of the radar data are provided (and therefore what other portions may be needed to produce a complete composite 3D image).

The sinogram unit 308 may be an example of a sampling unit that may determine what samples or portions of radar data are to be collected. In some cases, the sinogram unit 308 may use tokens stored in the token bank 306 to generate a pictorial representation of samples in a sampling process for a three dimensional tomographic reconstruction process. The sinogram unit 308 may be configured to identify different portions or projections of radar data that have been collected by the processing unit 300 (and other processing units for the processing unit of the master vehicle) based on the tokens. One or more sinograms 326 may be stored in the sinogram unit 308 based on the operation of the sinogram unit 308 as described herein.

The optimization algorithm unit 310 may be configured to receive the sinograms 326 and cue data 328 as inputs to generate control instructions 330. The cue data 328 may include information regarding the current location of the object on which data is being collected (e.g., from the master vehicle) and/or estimated feature data regarding the object. The control instructions 330 may be used by the sinogram unit 308 to update portions of the radar data collected for use in reconstructing the composite 3D image of the object and may include instructions for flight control and/or sensor control in some cases. The flight control instructions may be used to direct the vehicle to locations that may enable collection of data corresponding to missing portions of the radar data.

In an example embodiment, the processor 204 (of FIG. 2) may control operation of the processing unit 300 for collection of radar data and may then, in the master vehicle, use the radar data collected from various different processing units of each of the vehicles to generate a composite 3D image of the object (e.g., the target object 108). The composite 3D image of the object may then be used to identify (or confirm the identification of) the object based on comparison of the composite 3D image to known target data. In an example embodiment, the memory 206 may store a target library including image data for various different potential targets. In some cases, a publication such as *Jane's Fighting Ships* or other source may be used to provide data that can be used for comparison. As such, the processor 204 may be configured to determine the class or type of target that the object corresponds to and, in some cases, even perhaps the hull number of certain distinctive targets. The disclosure of commonly owned U.S. Patent Application Publication No. 2008/0308670 to Meyer et al., which is incorporated herein by reference, describes an example of the use of a target image library for comparing target image data to that of stored image data to determine a specific target.

Example embodiments of the present disclosure may utilize the identification of a specific target (e.g., target object 108) to determine vulnerabilities of the corresponding target. As discussed above, the location of the engine room, the control center, ammunition storage or other vulnerable areas on the target object 108 may be determined based on known information about the corresponding identified object. This information may then be used to generate aimpoint data that may be provided from the master vehicle to other vehicles. In some examples, the aimpoint data may include coordinate data such as global positioning system (GPS) coordinates that indicate the location of a vulnerable location on the target object 108. As such, the aimpoint data may identify a "sweet spot" for hitting the specific identified target. In some embodiments, the aimpoint data may be accompanied with or otherwise include the composite 3D image data as well.

In some example embodiments, the processor 204 may control operation of a target classifier 230 configured to identify or classify targets based on a comparison of the composite 3D image to known target data from a target library 232 (e.g., stored in the memory 206). The identity or classification of the target may then be used by an aimpoint generator 234 to generate aimpoint data as described above. Since each vehicle may be able to operate as the master, each vehicle may have a target library 232 on board. However, in some embodiments, only the master vehicle may actually employ the target library 232. The target library 232 may be updateable via a software modification.

As indicated previously, in some cases each of the vehicles (e.g., vehicles 100, 102 and 104) may have the capability of acting as a master vehicle. The launch platform 106 may specifically identify one of the vehicles as the master vehicle in some cases. However, in other cases, other criteria may be used for selection of the master vehicle and in some cases that selection may be made automatically by the vehicles themselves and a vehicle determining that it is or should be the master vehicle may announce to the other vehicles via the communication links 118. Criteria such as order of launch (e.g., first or last launched), order of arrival on scene or acquisition of the target (e.g., first or last to acquire contact with the target), processing or communication capability (e.g., if different vehicles are employed and have differing capabilities), battery or power level, device state (e.g., normal condition, interference level, damage status, etc.) and other factors may all be used to set specific conditions under which a particular vehicle may declare itself to be the master vehicle or relinquish master vehicle status to a more qualified vehicle. For example, if a particular vehicle is first on scene and declares itself to be the master vehicle initially, the particular vehicle may later transfer (or request another device to declare itself master) the master vehicle status to another vehicle in response to the particular vehicle taking damage (or losing communication completely), or having a low battery level which might limit its processing capabilities.

In some embodiments, a transit time may be defined for the vehicles 100, 102 and 104 to define the time that is allotted to collect data on the object to build an image of the object. The transit time may be programmed into each of the vehicles at launch, or may be communicated to the vehicles by the master vehicle. In some embodiments, the master vehicle may process data received to generate the composite 3D image as soon as sufficient data is available to generate the image and make a match to a corresponding image in the target library 232. However, if sufficient data has not yet been received by the time the transit time expires, the master vehicle may process available data and estimate the identity of the object based on the available data at the time of expiration of the transit time. Some embodiments may enable the master vehicle to extend the transit time one or more times for predefined intervals under certain conditions. However, some embodiments may define a maximum transit time (or minimum transit time) to ensure that a strike can be initiated within certain predetermined parameters.

After the master vehicle provides aimpoint data to the vehicles, attack on the target object 108 may be authorized either by virtue of the aimpoint data being provided or by separate message providing such authorization. In some cases, one or more of the vehicles that have been provided with the aimpoint data (e.g., those vehicles that are missiles) may simply attack the target based on the aimpoint data. However, in some other examples, the vehicles may continue to generate radar data on the target as they approach the target to further confirm (or even modify) the aimpoint data based on perceivable differences between the aimpoint data provided and the current position of the target (e.g., due to evasive maneuvers or other factors that may change target location or orientation). In both cases, the aimpoint data will define the most vulnerable point on the target.

Figure 4:
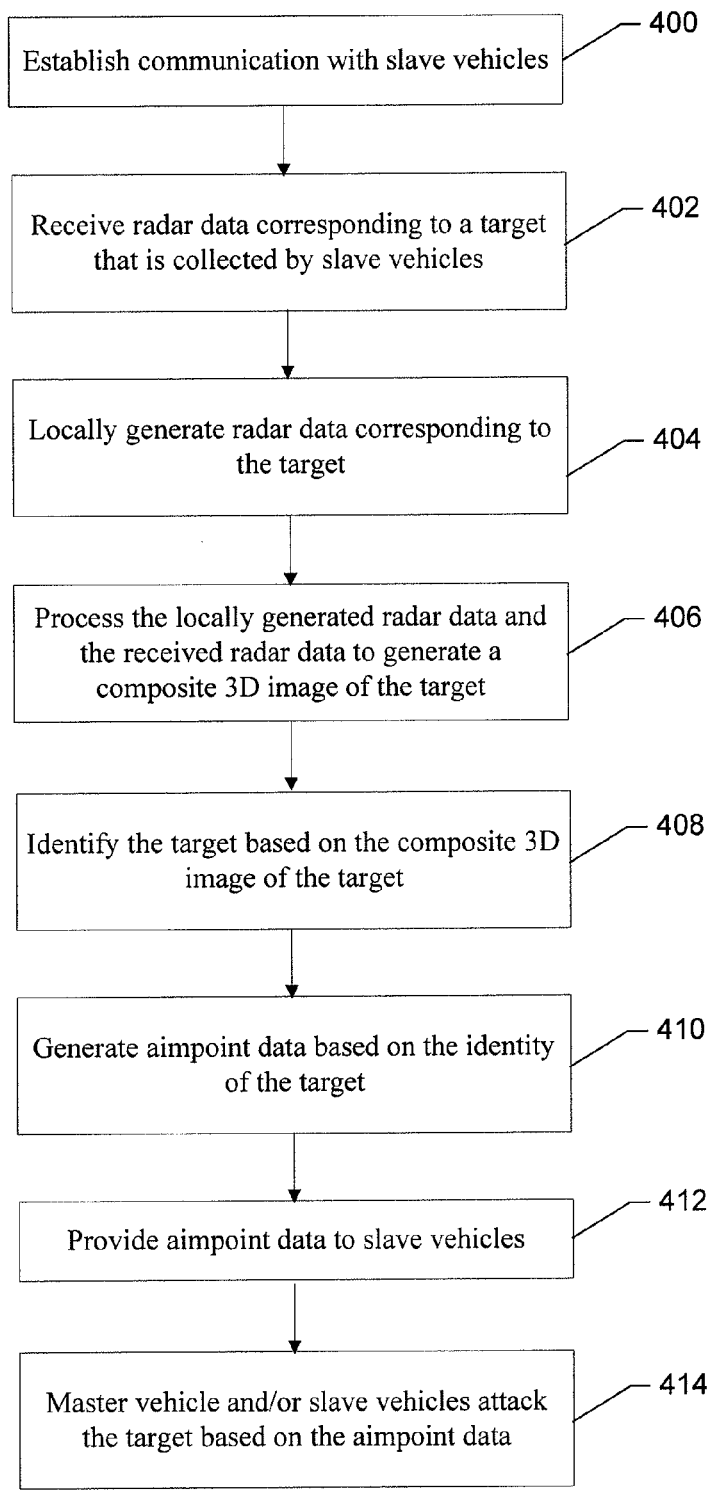
FIG. 4 illustrates a process flow for operation of a master vehicle according to an example embodiment.

FIG. 4 illustrates a process flow for operation of a master vehicle according to an example embodiment. As indicated at operation 400, the master vehicle may establish communication with slave vehicles. The master vehicle may receive radar data corresponding to a target that is collected by slave vehicles at operation 402. The master vehicle may also locally generate radar data corresponding to the target at operation 404. At operation 406, the locally generated radar data and the received radar data may be processed to generate a composite 3D image of the target. The composite 3D image of the target may be used to identify the target at operation 408 after which time aimpoint data may be generated based on the identity of the target at operation 410. The aimpoint data may be provided to the slave vehicles at operation 412. At operation 414, the master vehicle and/or the slave vehicles may attack the target based on the aimpoint data.

Figure 5:
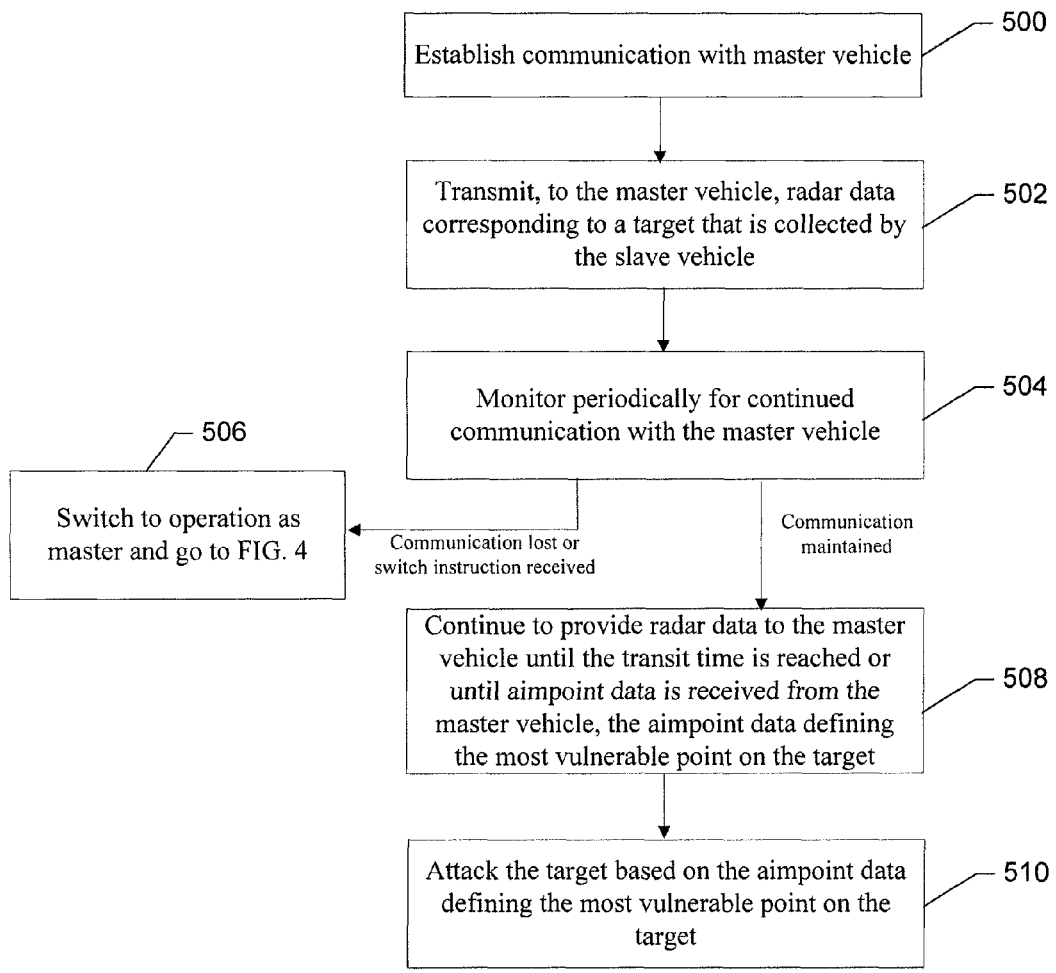
FIG. 5 illustrates a process flow for operation of a slave vehicle according to an example embodiment.

FIG. 5 illustrates a process flow for operation of a slave vehicle according to an example embodiment. At operation 500, the slave vehicle may establish communication with the master vehicle. The slave vehicle may transmit, to the master vehicle, radar data corresponding to a target that is collected by the slave vehicle at operation 502. The slave vehicle may monitor periodically for continued communication with the master vehicle at operation 504. If communication is lost (or if an instruction is received to switch to or assume master status), the slave vehicle may assume the role of master vehicle at operation 506 and shift to operation according to FIG. 4. However, if communication is maintained, the slave vehicle may continue to provide radar data to the master vehicle until the transit time is reached or until aimpoint data is received from the master vehicle at operation 508. At operation 510, the slave vehicle may attack the target based on the aimpoint data. That aimpoint data will define the most vulnerable point on the target.

As set forth herein, an example apparatus includes a memory storing at least a target library indicating respective target parameters for a plurality of known potential targets; and a processor configured by stored instructions to: generate a composite multi-dimensional representation of a target based on radar data received at the apparatus from other aerial vehicles collecting projections over an area in which the target is located and based on radar data collected by an aerial vehicle in which the apparatus is located, identify the target based on the composite multi-dimensional representation, and generate aimpoint data regarding the target based on an identity of the target, the aimpoint data defining a most vulnerable point on the target.

In some examples, the target library is updateable. In some examples, the processor is further configured to communicate the aimpoint data from the apparatus, acting as a master vehicle, to at least one of the other aerial vehicles acting as a slave vehicle. In some examples, identifying the target includes comparing the composite multi-dimensional representation of the target to a plurality of known representations of targets in the target library to determine the identity of the target based on a degree of matching between the composite multi-dimensional representation and one of the known representations. In some examples, generating aimpoint data includes utilizing characteristics regarding vulnerable locations within the target based on the identity of the target to generate coordinates for an aimpoint for attacking the target.

In some examples, the processor is further configured to shift the apparatus from a master vehicle status to a slave vehicle status causing the apparatus to stop generating the composite multi-dimensional representation identifying the target and generating the aimpoint data, and instead causing the apparatus to provide radar data generated by the aerial vehicle to one of the other aerial vehicles acting as a master vehicle and receive aimpoint data from the master vehicle. In some examples, the processor is further configured to define a transit time by which the processor is to identify the target and during which the aerial vehicles collect radar data regarding the target.

An example system including a plurality of aerial vehicles configured to generate radar data based on projections over an area in which a target is located, one of the plurality of aerial vehicles is configured to act as a master vehicle and remaining ones of the plurality of aerial vehicles are configured to act as slave vehicles, the slave vehicles being configured to provide radar data collected by respective ones of the slave vehicles to the master vehicle, and the master vehicle being configured to: generate a composite multi-dimensional representation of the target based on radar data received from the slave vehicles and radar data collected by the master vehicle, identify the target based on the composite multi-dimensional representation, and generate aimpoint data regarding the target based on an identity of the target, the aimpoint data defining a most vulnerable point on the target.

In some examples, the master vehicle is further configured to communicate the aimpoint data to at least one of the slave vehicles. In some examples, the master vehicle includes a target library indicating respective target parameters for a plurality of known potential targets. In some examples, the master vehicle is configured to identify the target by comparing the composite multi-dimensional representation of the target to a plurality of known representations of targets in the target library to determine the identity of the target based on a degree of matching between the composite multi-dimensional representation and one of the known representations. In some examples, the master vehicle is further configured to generate aimpoint data by utilizing characteristics regarding vulnerable locations within the target based on the identity of the target to generate coordinates for an aimpoint for attacking the target. In some examples, the master vehicle is configured to enable switching to a role of a slave vehicle or exit from the action and at least one of the slave vehicles is configured to switch to a role of a master vehicle. In some examples, the master vehicle is further configured to define a transit time by which the master vehicle is to identify the target and during which the master vehicle and the slave vehicles collect radar data regarding the target.

An example method includes receiving, at a master aerial vehicle, radar data corresponding to a target from at least one slave aerial vehicle in communication with the master vehicle; generating a composite multi-dimensional representation of the target based on radar data received from the at least one slave aerial vehicle and radar data collected by the master aerial vehicle; identifying the target based on the composite multi-dimensional representation; and generating aimpoint data regarding the target based on an identity of the target, the aimpoint data defining a most vulnerable point on the target. In some examples, the method includes communicating the aimpoint data to the at least one slave aerial vehicle.

In some examples, the identifying of the target includes comparing the composite multi-dimensional representation of the target to a plurality of known representations of targets in a target library to determine the identity of the target based on a degree of matching between the composite multi-dimensional representation and one of the known representations. In some examples, the generating of the aimpoint data includes utilizing characteristics regarding vulnerable locations within the target based on the identity of the target to generate coordinates for an aimpoint for attacking the target. In some examples, the method includes enabling the master aerial vehicle to switch to a role of a slave vehicle or exit from the action to enable at least one of the slave aerial vehicles to switch to a role of a master vehicle. In some examples, the master aerial vehicle is further configured to define a transit time by which the master aerial vehicle is to identify the target and during which the master aerial vehicle and the at least one slave aerial vehicle collect radar data regarding the target.

An example apparatus includes memory storing at least a target library indicating respective target parameters for a target; and a processor configured by stored instructions to: generate a composite three-dimensional image of the target by combining first radar data received at the apparatus from a first aerial vehicle collecting projections over an area in which the target is located and second radar data collected by a second aerial vehicle in which the apparatus is located, the first and second aerial vehicles being different from a launch platform, the first radar data corresponding to a first image of a first view of the target, the second radar data corresponding to a second image of a second view of the target, identify the target based on the composite three-dimensional image, and generate aimpoint data regarding the target based on an identity of the target, the aimpoint data defining a vulnerable point on the target, the processor is further to shift the apparatus from a master vehicle status to a slave vehicle status causing the apparatus to stop generating the composite three-dimensional image identifying the target and generating the aimpoint data, and instead causing the apparatus to provide radar data generated by the second aerial vehicle to the first aerial vehicle acting as a master vehicle and receive aimpoint data from the master vehicle.

In some examples, the first aerial vehicle or the second aerial vehicle is to attack the target based on the aimpoint data. In some examples, the target library is updateable. In some examples, the processor is to communicate the aimpoint data between the apparatus, acting as the slave vehicle, and the first aerial vehicle acting as a the master vehicle. In some examples, the processor is to the target by comparing the composite three-dimensional image of the target to a plurality of known representations of targets in the target library to determine the identity of the target based on a degree of matching between the composite three-dimensional image and one of the known representations. In some examples, the processor is to generate aimpoint data by utilizing characteristics regarding vulnerable locations within the target based on the identity of the target to generate coordinates for an aimpoint for attacking the target. In some examples, the processor is to define a transit time by which the processor is to identify the target and during which the aerial vehicles collect radar data regarding the target. In some examples, the first aerial vehicle or the second aerial vehicle includes a missile. In some examples, the launch platform is to launch a third vehicle, the third vehicle being different from the first and second aerial vehicles, the first and second aerial vehicles are to be associated with the launch platform, the third vehicle to receive the aimpoint data to attack the target. In some examples, the master vehicle is to communicate the aimpoint data to the slave vehicle or the third vehicle.

An example system including aerial vehicles configured to generate radar data based on projections over an area in which a target is located, a first aerial vehicle is to act as a master vehicle and a second aerial vehicle is to act as a slave vehicle, the first and second aerial vehicles being different than a launch platform, the slave vehicle to provide radar data collected by the slave vehicle to the master vehicle, and the master vehicle to: generate a composite three-dimensional image of the target based on first radar data received from the slave vehicle and second radar data collected by the master vehicle, the first radar data corresponding to a first image of the target, the second radar data corresponding to a second image of the target, identify the target based on the composite three-dimensional image, and generate aimpoint data regarding the target based on an identity of the target, the aimpoint data defining a vulnerable point on the target, the master vehicle is to enable switching to a role of a slave vehicle or exit from an action and the slave vehicle is to switch to a role of a master vehicle.

In some examples, the master vehicle is to define a transit time by which the master vehicle is to identify the target and during which the master vehicle and the slave vehicle collect radar data regarding the target. In some examples, the master vehicle includes a target library indicating respective target parameters for a plurality of known potential targets. In some examples, the master vehicle is to identify the target by comparing the composite three-dimensional image of the target to a plurality of known representations of targets in the target library to determine the identity of the target based on a degree of matching between the composite three-dimensional image and one of the known representations. In some examples, the master vehicle is to generate aimpoint data by utilizing characteristics regarding vulnerable locations within the target based on the identity of the target to generate coordinates for an aimpoint for attacking the target.

An example method includes receiving, at a master aerial vehicle, first radar data corresponding to a first image of a target from a slave aerial vehicle in communication with the master vehicle, the master aerial vehicle and the slave aerial vehicle being different from a launch platform; generating a composite three-dimensional image of the target based on the first radar data received from the slave aerial vehicle and second radar data collected by the master aerial vehicle, the first radar data corresponding to a first image of the target, the second radar data corresponding to a second image of the target; identifying the target based on the composite three-dimensional image; generating aimpoint data regarding the target based on an identity of the target, the aimpoint data defining a vulnerable point on the target; and enabling the master aerial vehicle to switch to a role of a slave vehicle or exit from an action to enable the slave aerial vehicle to switch to a role of a master vehicle.

In some examples, the master and slave aerial vehicles are to be associated with the launch platform; further including: communicating the aimpoint data to the slave aerial vehicle; and in response to the aimpoint data received, the slave aerial vehicle to attack the target. In some examples, the master aerial vehicle is to define a transit time by which the master aerial vehicle is to identify the target and during which the master aerial vehicle and the slave aerial vehicle collect radar data regarding the target. In some examples, identifying the target includes comparing the composite three-dimensional image of the target to a plurality of known representations of targets in a target library to determine the identity of the target based on a degree of matching between the composite three-dimensional image and one of the known representations. In some examples, generating aimpoint data includes utilizing characteristics regarding vulnerable locations within the target based on the identity of the target to generate coordinates for an aimpoint for attacking the target.

In some examples, the memory may store at least a target library indicating respective target parameters for a plurality of known potential targets. In some examples, the processor may be configured by stored instructions to generate a composite multi-dimensional representation of a target based on radar data received at the apparatus from other aerial vehicles collecting projections over an area in which the target is located and based on radar data collected by an aerial vehicle in which the apparatus is located, identify the target based on the composite multi-dimensional representation, and generate aimpoint data regarding the target based on an identity of the target. In some examples, the aimpoint data defining the most vulnerable point on the target.

Many modifications and other embodiments of the disclosure set forth herein will come to mind to one skilled in the art to which these embodiments pertain having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A tangible machine-readable medium comprising instructions which, when executed, cause a processor to at least:
generate a composite three-dimensional image of a target by combining first radar data accessed by an apparatus from a first aerial vehicle and second radar data collected by a second aerial vehicle, the first and second aerial vehicles being different from a launch platform, the first radar data corresponding to a first image of a first view of the target, the second radar data corresponding to a second image of a second view of the target;
change a master vehicle status from one of the apparatus, the first aerial vehicle, or the second aerial vehicle to another one of the apparatus, the first aerial vehicle, or the second aerial vehicle;
identify the target based on the composite three-dimensional image; and
generate aimpoint data regarding the target based on the identity of the target, the aimpoint data defining a vulnerable point on the target.

2. The machine-readable medium of claim 1, wherein the instructions, when executed, further cause the processor to communicate the aimpoint data between the apparatus acting as a slave vehicle and the first aerial vehicle acting as a master vehicle.

3. The machine-readable medium of claim 1, wherein the instructions, when executed, further cause the processor to identify the target by comparing the composite three-dimensional image of the target to known representations of targets in a target library to determine the identity of the target based on a degree of matching between the composite three-dimensional image and one of the known representations.

4. The machine-readable medium of claim 1, wherein the instructions, when executed, further cause the processor to generate the aimpoint data by utilizing characteristics regarding vulnerable locations of the target based on the identity of the target to generate coordinates for an aimpoint for attacking the target.

5. The machine-readable medium of claim 1, wherein the instructions, when executed, further cause the processor to define a transit time by which the processor is to identify the target and during which the first and second aerial vehicles collect radar data regarding the target.

6. The machine-readable medium of claim 1, wherein the instructions, when executed, further cause the processor to cause the first aerial vehicle or the second aerial vehicle to attack the target based on the aimpoint data.

7. A tangible machine-readable medium comprising instructions which, when executed, cause a processor to at least: generate a composite three-dimensional image of a target by combining first radar data accessed by an apparatus from a first aerial vehicle and second radar data collected by a second aerial vehicle, the first and second aerial vehicles being different from a launch platform, the first radar data corresponding to a first image of a first view of the target, the second radar data corresponding to a second image of a second view of the target;
identify the target based on the composite three-dimensional image;
generate aimpoint data regarding the target based on the identity of the target, the aimpoint data defining a vulnerable point on the target; and
shift the apparatus from a master vehicle status to a slave vehicle status and provide radar data generated by the second aerial vehicle to the first aerial vehicle acting as a master vehicle and receive the aimpoint data from the master vehicle.

8. A tangible machine-readable medium comprising instructions which, when executed, cause a processor to at least:
generate a composite three-dimensional image of a target based on first radar data received from a slave vehicle and second radar data collected by a master vehicle, the first radar data corresponding to a first image of the target, the second radar data corresponding to a second image of the target;
identify the target based on the composite three-dimensional image;
generate aimpoint data regarding the target based on the identity of the target, the aimpoint data defining a vulnerable point on the target; and
change a master vehicle status of the master vehicle to a slave vehicle status.

9. The machine-readable medium of claim 8, wherein a first aerial vehicle is to act as the master vehicle and a second aerial vehicle is to act as the slave vehicle, the first and second aerial vehicles being different than a launch platform, the slave vehicle to provide radar data collected by the slave vehicle to the master vehicle.

10. The machine-readable medium of claim 9, wherein, the launch platform is to launch a third vehicle, the third vehicle being different from the first and second aerial vehicles, the first and second aerial vehicles are to be associated with the launch platform, the third vehicle to receive the aimpoint data to attack the target.

11. The machine-readable medium of claim 10, wherein the third vehicle includes a missile.

12. The machine-readable medium of claim 10, wherein the instructions, when executed, further cause the processor to communicate the aimpoint data to the slave vehicle or the third vehicle.

13. The machine-readable medium of claim 8, wherein the instructions, when executed, further cause the processor to identify the target by comparing the composite three-dimensional image of the target to known representations of targets in a target library to determine the identity of the target based on a degree of matching between the composite three-dimensional image and one of the known representations.

14. The machine-readable medium of claim 8, wherein the instructions, when executed, further cause the processor to generate aimpoint data by utilizing characteristics regarding vulnerable locations of the target based on the identity of the target to generate coordinates for an aimpoint for attacking the target.

15. The machine-readable medium of claim 8, wherein the instructions, when executed, further cause the processor to define a transit time by which the master vehicle is to identify the target and during which the master vehicle and the slave vehicle collect radar data regarding the target.

16. A tangible machine-readable medium comprising instructions which, when executed, cause a processor to at least:
generate a composite three-dimensional image of a target based on first radar data received from a slave vehicle and second radar data collected by a master vehicle, the first radar data corresponding to a first image of the target, the second radar data corresponding to a second image of the target;

identify the target based on the composite three-dimensional image;

generate aimpoint data regarding the target based on the identity of the target, the aimpoint data defining a vulnerable point on the target; and enable the master vehicle to switch to a role of a slave vehicle or exit from an action and to enable the slave vehicle to switch to a role of a master vehicle.

17. An apparatus, comprising:

a housing; and a processor disposed in the housing, the processor to:

access first radar data corresponding to a first image of a target from a slave aerial vehicle in communication with a master aerial vehicle;

generate a composite three-dimensional image of the target based on the first radar data accessed from the slave aerial vehicle and second radar data accessed from the master aerial vehicle, the first radar data corresponding to a first image of the target, the second radar data corresponding to a second image of the target;

identify the target based on the composite three-dimensional image;

generate aimpoint data regarding the target based on the identity of the target; and cause the master aerial vehicle to attack the target after changing the master aerial vehicle from a mater vehicle status to a slave vehicle status.

18. The apparatus of claim 17, wherein the processor is to communicate the aimpoint data between the slave aerial vehicle and the master aerial vehicle.

19. The apparatus of claim 17, wherein the processor is to identify the target by comparing the composite three-dimensional image of the target to a plurality of known representations of targets in a target library to determine the identity of the target based on a degree of matching between the composite three-dimensional image and one of the known representations.

20. The apparatus of claim 17, wherein the processor is to generate aimpoint data by utilizing characteristics regarding vulnerable locations of the target based on the identity of the target to generate coordinates for an aimpoint for attacking the target.

21. The apparatus of claim 17, wherein the processor is to define a transit time by which the processor is to identify the target and during which the master and slave aerial vehicles collect radar data regarding the target.

22. The apparatus of claim 17, wherein the processor is to cause the master aerial vehicle or the slave aerial vehicle to attack the target based on the aimpoint data.

23. The apparatus of claim 17, wherein the master aerial vehicle or the slave aerial vehicle includes a missile.

24. An apparatus comprising:

a housing; and a processor disposed in the housing, the processor to:

access first radar data corresponding to a first image of a target from a slave aerial vehicle in communication with a master aerial vehicle;

generate a composite three-dimensional image of the target based on the first radar data accessed from the slave aerial vehicle and second radar data accessed from the master aerial vehicle, the first radar data corresponding to a first image of the target, the second radar data corresponding to a second image of the target;

identify the target based on the composite three-dimensional image;

generate aimpoint data regarding the target based on the identity of the target; and enable the master aerial vehicle to switch to a role of a slave aerial vehicle or exit from an action to enable the slave aerial vehicle to switch to a role of a master aerial vehicle.

25. A method, comprising:

identifying a target based on a composite three-dimensional image generated based on data received from a first aerial vehicle acting as a master vehicle and a second aerial vehicle acting as a slave vehicle;

changing a role of the first aerial vehicle to the slave vehicle;

changing the role of the second aerial vehicle to the master vehicle; and causing, using the second aerial vehicle acting as the master vehicle, a third vehicle to attack the target based on the identity of the target.

26. The method of claim 25, wherein the first aerial vehicle or the second aerial vehicle includes the third vehicle.

27. A tangible machine-readable medium comprising instructions which, when executed, cause a processor to at least:

generate a first composite three-dimensional image of a target by combining first radar data collected by a first aerial vehicle and second radar data collected by a second aerial vehicle, the first radar data corresponding to a first image of a first view of the target, the second radar data corresponding to a second image of a second view of the target;

change a master vehicle status from one of an apparatus, the first aerial vehicle, or the second aerial vehicle to another of the apparatus, the first aerial vehicle, or the second aerial vehicle;

generate a second composite three-dimensional image of the target by combining third radar data and fourth radar data accessed by the other one of the apparatus, the first aerial vehicle, or the second aerial vehicle having the master vehicle status;

identify the target based on the second composite three-dimensional image; and generate aimpoint data regarding the target based on the identity of the target.

28. The machine-readable medium of claim 27, wherein the processor is to generate the aimpoint data regarding the target at the other of the apparatus, the first aerial vehicle, or the second aerial vehicle having the master vehicle status.

\* \* \* \* \*